United States Patent
Duong et al.

(10) Patent No.: US 12,473,835 B2
(45) Date of Patent: Nov. 18, 2025

(54) VANE ARRAY STRUCTURE WITH RECESSED STATOR VANES

(71) Applicant: Pratt & Whitney Canada Corp., Longueuil (CA)

(72) Inventors: Hien Duong, Mississauga (CA); Vijay Kandasamy, Tamil Nadu (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/582,174

(22) Filed: Feb. 20, 2024

(65) Prior Publication Data
US 2024/0280030 A1     Aug. 22, 2024

(30) Foreign Application Priority Data

Feb. 20, 2023  (IN) .............................. 202311011509

(51) Int. Cl.
F01D 9/04     (2006.01)

(52) U.S. Cl.
CPC ........ F01D 9/041 (2013.01); *F05D 2240/122* (2013.01); *F05D 2240/80* (2013.01)

(58) Field of Classification Search
CPC .......... F01D 5/141; F01D 5/142; F01D 5/143; F01D 5/145; F01D 5/146; F01D 9/041; F05D 2240/80; F05D 2240/122
See application file for complete search history.

(56) References Cited

U.S. PATENT DOCUMENTS

| | | | | |
|---|---|---|---|---|
| 2,355,413 A | * | 8/1944 | Bloomberg | ............ F01D 5/141 416/228 |
| 2,801,790 A | * | 8/1957 | Doll, Jr. | ................ F04D 29/681 416/223 R |
| 5,088,892 A | * | 2/1992 | Weingold | ................ F01D 5/145 415/193 |
| 6,375,419 B1 | * | 4/2002 | LeJambre | ............... F01D 5/141 415/208.2 |
| 12,078,189 B2 | * | 9/2024 | Nichols | ................. F01D 17/162 |
| 2010/0303629 A1 | | 12/2010 | Guemmer | |

(Continued)

FOREIGN PATENT DOCUMENTS

EP     1612372 B1     10/2014

OTHER PUBLICATIONS

EP Search Report for EP Patent Application No. 24158678.3 dated Jul. 8, 2024.

*Primary Examiner* — Courtney D Heinle
*Assistant Examiner* — Cameron A Corday
(74) *Attorney, Agent, or Firm* — Getz Balich LLC

(57) ABSTRACT

A vane array structure for a gas turbine engine includes a first platform, a second platform, a plurality of vanes and a flowpath. Each of the vanes extends across the flowpath between the first platform and the second platform. The vanes include a first vane and a second vane disposed longitudinally next to the first vane along the flowpath. The first vane includes a first airfoil and a first recess. The first airfoil extends spanwise between a first end at the first platform and a second end at the second platform. The first airfoil extends chordwise between a leading edge and a trailing edge. The first airfoil extends laterally between a first side and a second side. The first recess projects spanwise into the first airfoil from the first end. The first recess projects chordwise into the first airfoil from the trailing edge.

17 Claims, 9 Drawing Sheets

(56) References Cited

U.S. PATENT DOCUMENTS

| | | |
|---|---|---|
| 2013/0209246 A1 | 8/2013 | Gbadebo |
| 2014/0044518 A1* | 2/2014 | Wunderer ............... F01D 5/141 |
| | | 415/162 |
| 2015/0240648 A1 | 8/2015 | Guemmer |
| 2018/0142703 A1* | 5/2018 | Duong ................. F04D 29/542 |
| 2018/0298760 A1* | 10/2018 | Subramaniyan ........ F01D 9/041 |

* cited by examiner

VANE ARRAY STRUCTURE WITH RECESSED STATOR VANES

This application claims priority to Indian Patent Appln. No. 202311011509 filed Feb. 20, 2023, which is hereby incorporated herein by reference in its entirety.

TECHNICAL FIELD

This disclosure relates generally to a gas turbine engine and, more particularly, to a stator vane array structure for the gas turbine engine.

BACKGROUND INFORMATION

A gas turbine engine includes stator vane array structures to condition and/or turn gas flowing within a flowpath of the gas turbine engine. Various types and configurations of vane array structures are known in the art. These vane array structures include both structures with a single array of vanes and structures with two arrays of vanes. While these known vane array structures have various benefits, there is still room in the art for improvement.

SUMMARY

According to an aspect of the present disclosure, an apparatus is provided for a gas turbine engine. This turbine engine apparatus includes a vane array structure. The vane array structure includes a first platform, a second platform, a plurality of vanes and a flowpath extending longitudinally through the vane array structure. The first platform forms a first peripheral boundary of the flowpath. The second platform forms a second peripheral boundary of the flowpath. Each of the vanes extends across the flowpath between the first platform and the second platform. The vanes include a first vane and a second vane disposed longitudinally next to the first vane along the flowpath. The first vane includes a first airfoil and a first recess. The first airfoil extends spanwise along a span line between a first end at the first platform and a second end at the second platform. The first airfoil extends chordwise along a chord line between a leading edge and a trailing edge. The first airfoil extends laterally between a first side and a second side. The first recess projects spanwise into the first airfoil from the first end. The first recess projects chordwise into the first airfoil from the trailing edge. The first recess extends laterally through the first airfoil between the first side and the second side.

According to another aspect of the present disclosure, another apparatus is provided for a gas turbine engine. This turbine engine apparatus includes a vane array structure. The vane array structure includes a first platform, a second platform, a plurality of vanes and a flowpath extending longitudinally through the vane array structure. The first platform forms a first peripheral boundary of the flowpath. The second platform forms a second peripheral boundary of the flowpath. Each of the vanes extends across the flowpath between the first platform and the second platform. The vanes include a first vane and a second vane disposed longitudinally next to the first vane along the flowpath. The first vane extends spanwise along a span line from the first platform to the second platform. The first vane extends chordwise along a chord line between a leading edge and a trailing edge. The first vane extends laterally between a first side and a second side. The first vane has a chordwise length. The chordwise length has a first value at an intermediate point along the span line. The chordwise length has a second value at a first end point adjacent the first platform. The chordwise length has a third value at a second end point adjacent the second platform. The second value is less than the first value and the third value.

According to still another aspect of the present disclosure, another apparatus is provided for a gas turbine engine. This turbine engine apparatus includes a vane array structure. The vane array structure includes a first platform, a second platform, a plurality of vanes and a flowpath extending longitudinally through the vane array structure. The first platform forms a first peripheral boundary of the flowpath. The second platform forms a second peripheral boundary of the flowpath. Each of the vanes extends across the flowpath from the first platform to the second platform. A first set of the vanes are arranged into a first array about a centerline. A second set of the vanes are arranged into a second array about the centerline. The second array is disposed longitudinally next to the first array along the flowpath. The first set of the vanes include a first vane. The second set of the vanes include a second vane. The first vane includes a first airfoil and a first recess projecting into the first airfoil from a trailing edge of the first airfoil. The first recess is adjacent the first platform. The second vane includes a second airfoil and a second recess projecting into the second airfoil from a trailing edge of the second airfoil. The second recess is adjacent the first platform.

The second value may be between eighty percent and ninety-five percent of the first value. The third value may be between ninety-five percent and one-hundred and five percent of the first value.

The first vane may be upstream of the second vane along the flowpath.

The first vane may be downstream of the second vane along the flowpath.

The first platform may be a radial inner platform. The second platform may be a radial outer platform that circumscribes the radial inner platform.

The first recess may project spanwise into the first airfoil to a recess end. At least a portion of the recess end may have a straight line geometry.

The first recess may project spanwise into the first airfoil to a recess end. At least a portion of the recess end may have a curved geometry.

The first recess may project spanwise into the first airfoil to a recess end. At least a portion of the recess end may have a compound geometry.

A spanwise height of the first recess may decrease as the first recess projects chordwise into the first airfoil.

A chordwise length of the first recess may decrease as the first recess projects spanwise into the first airfoil.

The first recess may project spanwise into the first airfoil to a recess end. The recess end may be angularly offset from the first end of the first airfoil by an angle between ten degrees and seventy degrees.

The first recess may project spanwise into the first airfoil to a recess end. The recess end may be angularly offset from the trailing edge of the first airfoil by an angle between ten degrees and seventy degrees.

The first airfoil may have an airfoil spanwise height. The first recess may have a recess spanwise height that is less than or equal to ten percent of the airfoil spanwise height.

The first airfoil may have an airfoil spanwise height. The first recess may have a recess spanwise height that is between ten percent and twenty percent of the airfoil spanwise height.

The first airfoil may have an airfoil chordwise length. The first recess may have a recess chordwise length that is less than or equal to ten percent of the airfoil chordwise length.

The first airfoil may have an airfoil chordwise length. The first recess may have a recess chordwise length that is between ten percent and twenty percent of the airfoil chordwise length.

The trailing edge of the first airfoil may be angularly offset from the second peripheral boundary of the flowpath, at an intersection between the trailing edge of the first airfoil and the second platform, by an angle between eighty degrees and ninety degrees.

The second vane may include a second airfoil with a leading edge. The leading edge of the second airfoil may be circumferentially offset from the leading edge of the first airfoil about a centerline of the vane array structure.

The second vane may include a second airfoil and a second recess. The second airfoil may extend spanwise along a span line of the second airfoil between a first end of the second airfoil at the first platform and a second end of the second airfoil at the second platform. The second airfoil may extend chordwise along a chord line of the second airfoil between a leading edge of the second airfoil and a trailing edge of the second airfoil. The second airfoil may extend laterally between a first side of the second airfoil and a second side of the second airfoil. The second recess may project spanwise into the of the second airfoil from the first end of the second airfoil. The second recess may project chordwise into the second airfoil from the trailing edge of the second airfoil. The second recess may extend laterally through the second airfoil between the first side of the second airfoil and the second side of the second airfoil.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
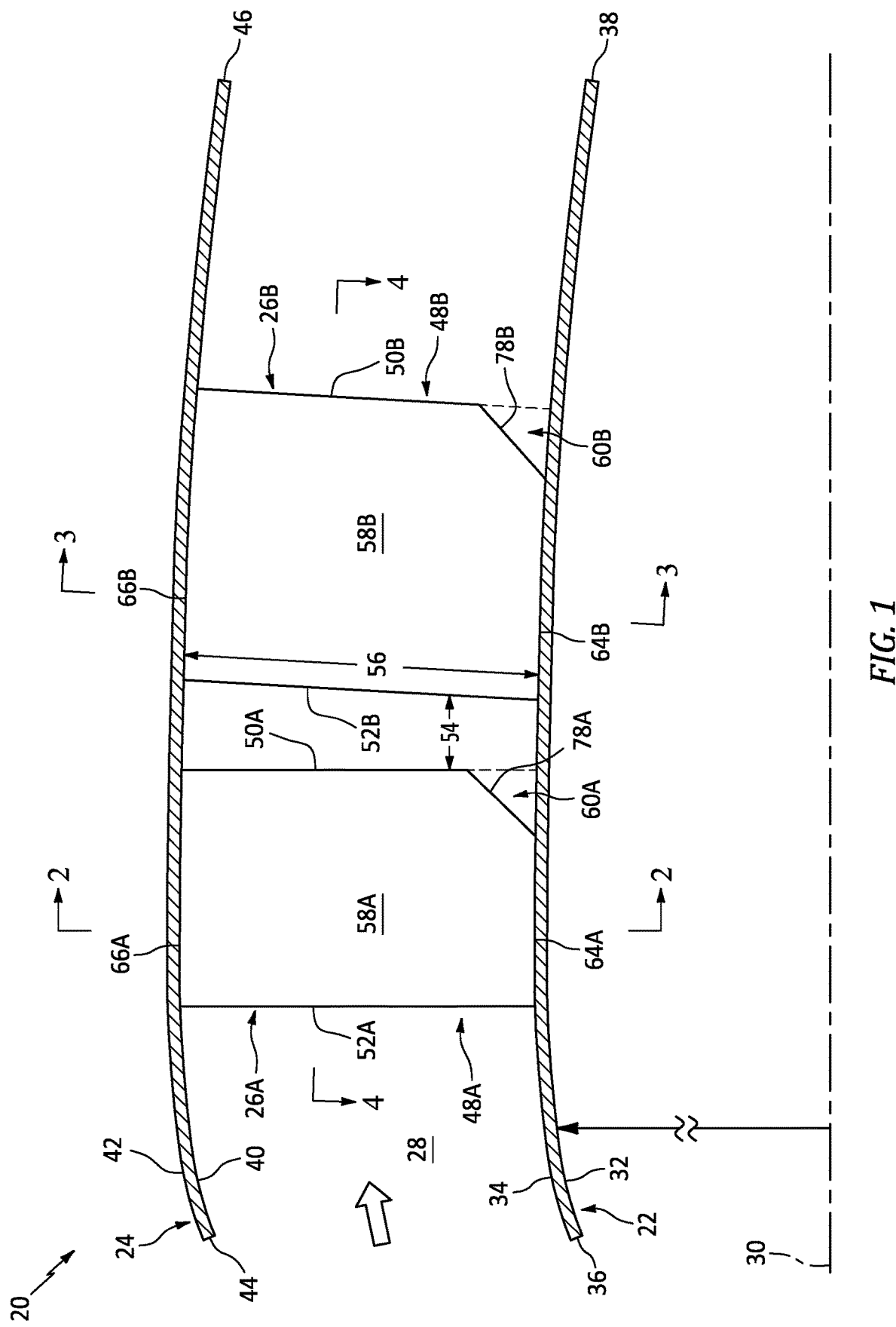
FIG. 1 is a sectional illustration of a portion of a stator vane array structure.

FIG. 1 illustrates a portion of a stator vane array structure 20 for a gas turbine engine. This vane array structure 20 may be configured as an inter-compressor vane array structure. The vane array structure 20, for example, may be arranged between a high pressure compressor rotor and a low pressure compressor rotor. In another example, the vane array structure 20 may be arranged between different stages of a common (e.g., the same) compressor rotor. Alternatively, the vane array structure 20 may be configured as an inlet vane array structure or an exit vane array structure for a compressor section of the gas turbine engine. The vane array structure 20, for example, may be arranged at (e.g., on, adjacent or proximate) an inlet to or an outlet from the compressor section. The present disclosure, however, is not limited to the foregoing exemplary vane array structure arrangements. For example, it is contemplated the vane array structure 20 may alternatively be arranged with (e.g., within, at an inlet to or an outlet from) a turbine section of the gas turbine engine.

The vane array structure 20 of FIG. 1 is configured as a multi-vane array structure such as a double vane array structure. The vane array structure 20 of FIG. 1, for example, includes a radial inner platform 22, a radial outer platform 24 and a plurality of stator vanes 26A and 26B (generally referred to as "26"). The vane array structure 20 also includes a (e.g., annular) core flowpath 28 that extends longitudinally through the vane array structure 20.

Figure 2:
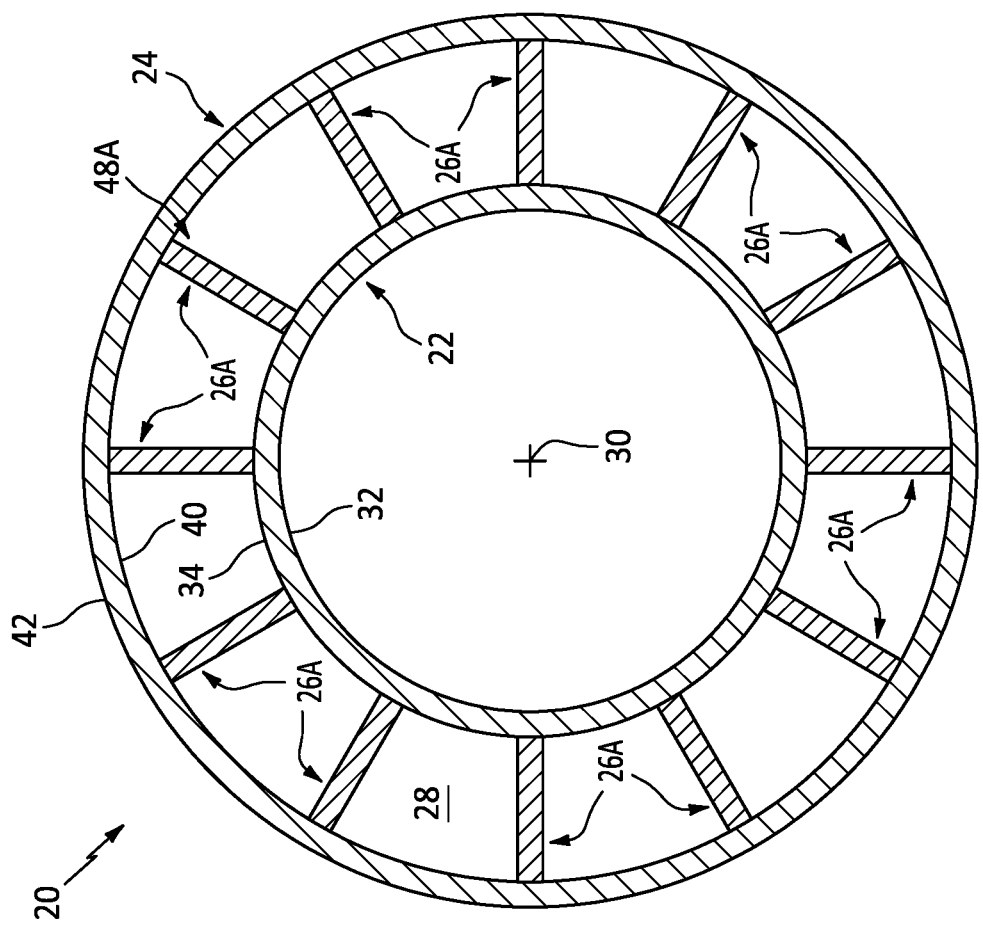
FIG. 2 is a cross-sectional illustration of the vane array structure taken along line 2-2 in FIG. 1.
Figure 3:
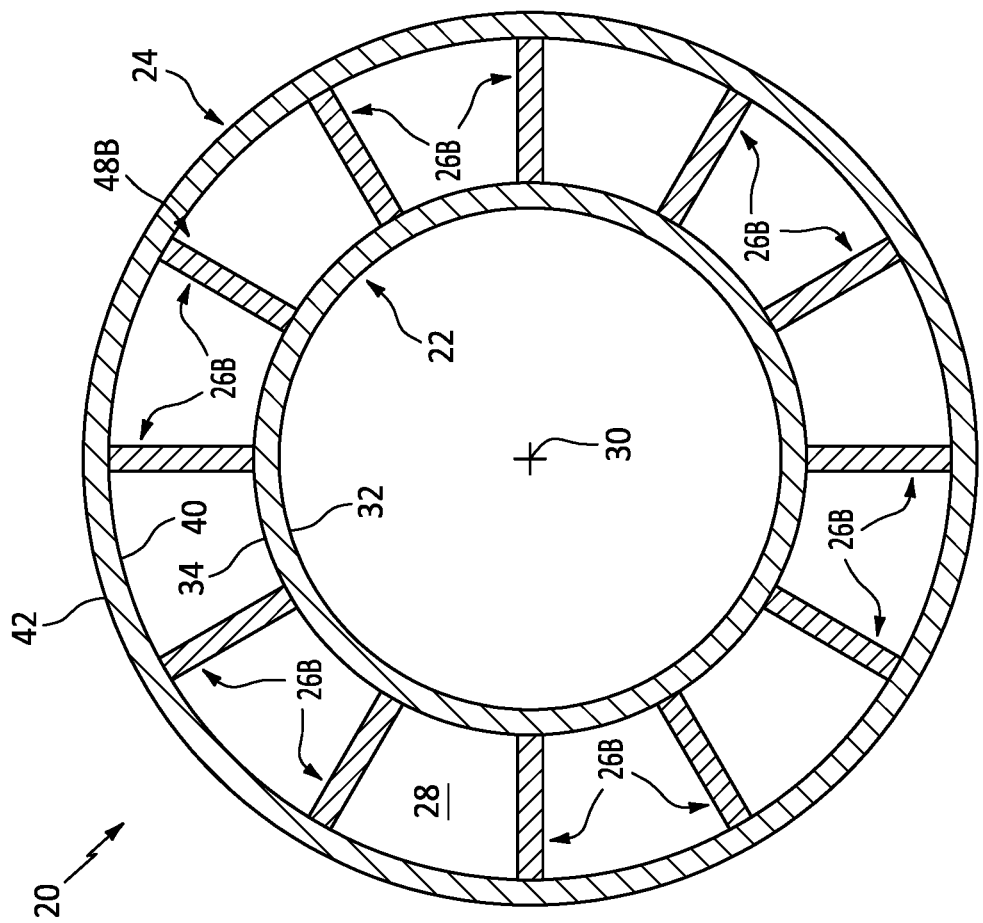
FIG. 3 is a cross-sectional illustration of the vane array structure taken along line 3-3 in FIG. 1.

Referring to FIGS. 2 and 3, the inner platform 22 extends circumferentially about (e.g., completely around) an axial centerline 30 of the vane array structure 20, which axial centerline 30 may also be an axial centerline of the inner platform 22. The inner platform 22 extends radially between and to an inner side 32 of the inner platform 22 and an outer side 34 of the inner platform 22. At the inner platform outer side 34, the inner platform 22 of FIG. 1 forms a radial inner peripheral boundary of the core flowpath 28 longitudinally within (and through) the vane array structure 20. The inner platform 22 extends longitudinally along the core flowpath 28 (e.g., axially along the axial centerline 30) between and to an upstream end 36 of the inner platform 22 and a downstream end 38 of the inner platform 22.

Referring to FIGS. 2 and 3, the outer platform 24 extends circumferentially about (e.g., completely around) the axial centerline 30, which axial centerline 30 may also be an axial centerline of the outer platform 24. The outer platform 24 extends radially between and to an inner side 40 of the outer platform 24 and an outer side 42 of the outer platform 24. At the outer platform inner side 40, the outer platform 24 of FIG. 1 forms a radial outer peripheral boundary of the core flowpath 28 longitudinally within (and through) the vane array structure 20. The outer platform 24 extends longitudinally along the core flowpath 28 (e.g., axially along the axial centerline 30) between and to an upstream end 44 of the outer platform 24 and a downstream end 46 of the outer platform 24.

The outer platform 24 of FIG. 1 is spaced radially outboard of the inner platform 22. The outer platform 24 is longitudinally aligned with and/or longitudinally (e.g., axially) overlaps at least a portion or an entirety of the inner platform 22, and vice versa. Referring to FIGS. 2 and 3, the outer platform 24 circumscribes the inner platform 22. With this arrangement, the core flowpath 28 may have an annular geometry when viewed, for example, in a first reference plane perpendicular to the axial centerline 30.

Referring to FIG. 2, the upstream vanes 26A are distributed circumferentially about the axial centerline 30 in a (e.g., circular) upstream vane array 48A, which axial centerline 30 may also be an axial centerline of the upstream vane array 48A. Referring to FIG. 3, the downstream vanes 26B are distributed circumferentially about the axial centerline 30 in a (e.g., circular) downstream vane array 48B, which axial centerline 30 may also be an axial centerline of the downstream vane array 48B. Referring to FIG. 1, the stator vanes 26 are arranged within the core flowpath 28. Each stator vane 26 of FIG. 1, for example, extends (e.g., radially) between and to the inner platform 22 and the outer platform 24. Each stator vane 26 is also connected to (e.g., formed integral with or otherwise fixedly attached to) the inner platform 22 and/or the outer platform 24. With this arrangement, each stator vane 26 extends (e.g., generally radially) across the core flowpath 28 from the inner platform 22 to the outer platform 24.

The upstream vane array 48A and its upstream vanes 26A are arranged upstream of the downstream vane array 48B and its downstream vanes 26B longitudinally along the core flowpath 28. The upstream vane array 48A and its upstream vanes 26A are also disposed longitudinally next to (e.g., adjacent) or otherwise longitudinally proximate the downstream vane array 48B and its downstream vanes 26B. A trailing edge 50A of each upstream vane 26A, for example, may be slightly spaced from a leading edge 52B of a respective downstream vane 26B by a longitudinal inter-vane distance 54. This inter-vane distance 54 may be smaller than a height 56 of the core flowpath 28; e.g., a (e.g., radial) distance from the inner platform outer side 34 to the outer platform inner side 40. The flowpath height 56, for example, may be two times (2×), three times (3×), four times (4×), five times (5×) or more the inter-vane distance 54. The present disclosure, however, is not limited to such an exemplary arrangement. The upstream vane trailing edge 50A, for example, may alternatively be longitudinally aligned with the downstream vane leading edge 52B. In another example, the upstream vane array 48A and its upstream vanes 26A may overlap the downstream vane array 48B and its downstream vanes 26B along the core flowpath 28. The upstream vane trailing edge 50A, for example, may be (e.g., slightly) longitudinally upstream of the downstream vane leading edge 52B.

Figure 4:
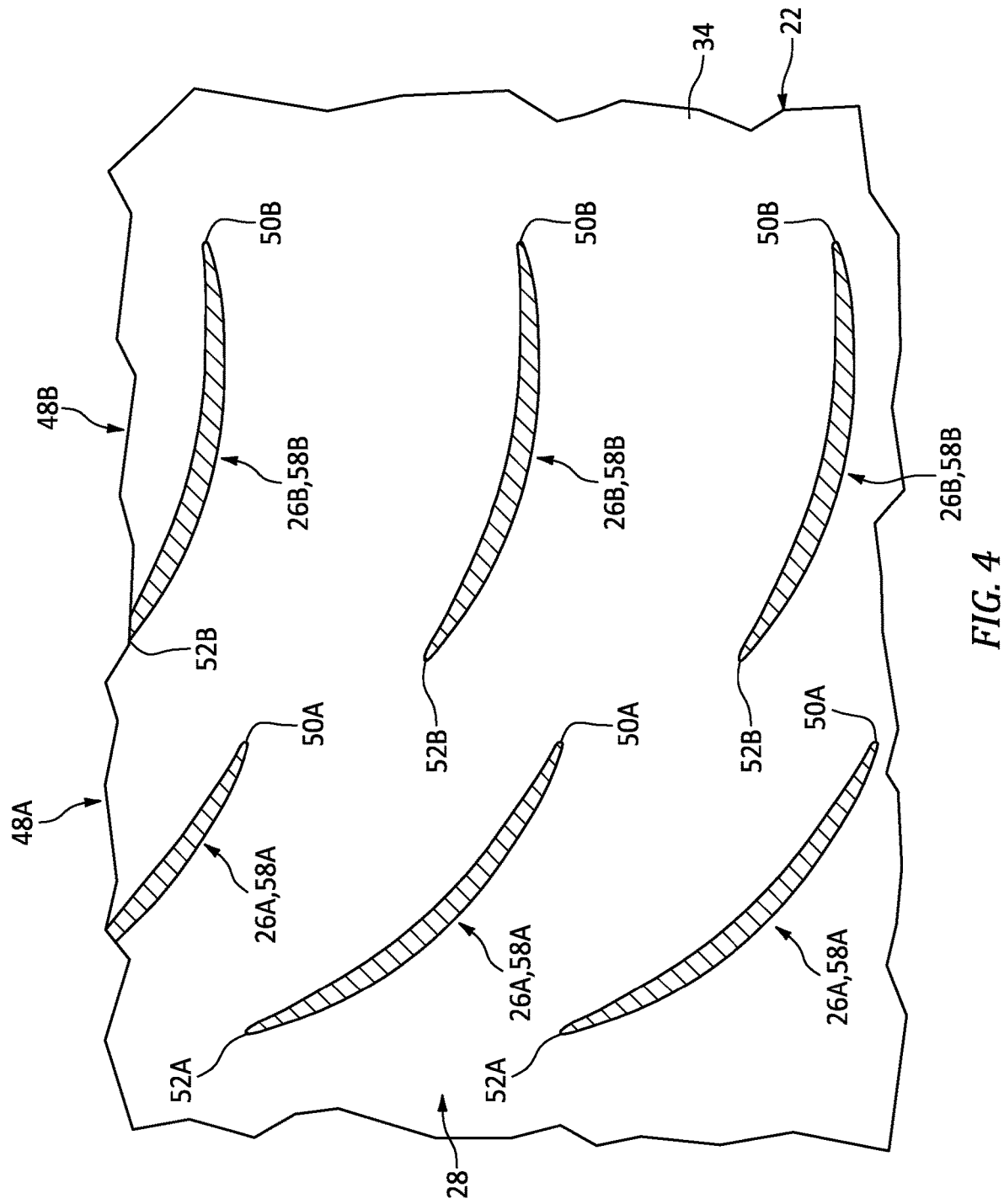
FIG. 4 is a sectional illustration of a portion of the vane array structure taken along line 4-4 in FIG. 1.

Referring to FIG. 4, the upstream vanes 26A in the upstream vane array 48A may be circumferentially offset from the downstream vanes 26B in the downstream vane array 48B. The leading edge 52B of each downstream vane 26B of FIG. 4, for example, is disposed circumferentially between the trailing edges 50A of a respective circumferentially neighboring (e.g., adjacent) pair of the upstream vanes 26A. Each downstream vane leading edge 52B may be circumferentially centered between the trailing edges 50A of the respective circumferentially neighboring pair of the upstream vanes 26A. The present disclosure, however, is not limited to such an exemplary arrangement. For example, one or more or all of the downstream vane leading edges 52B may each alternatively be positioned circumferentially closer to one of the trailing edges 50A of the respective circumferentially neighboring pair of the upstream vanes 26A than the other. In another example, one or more or all of the downstream vane leading edges 52B may each alternatively be circumferentially aligned with a respective one of the upstream vane trailing edges 50A.

Figure 5:
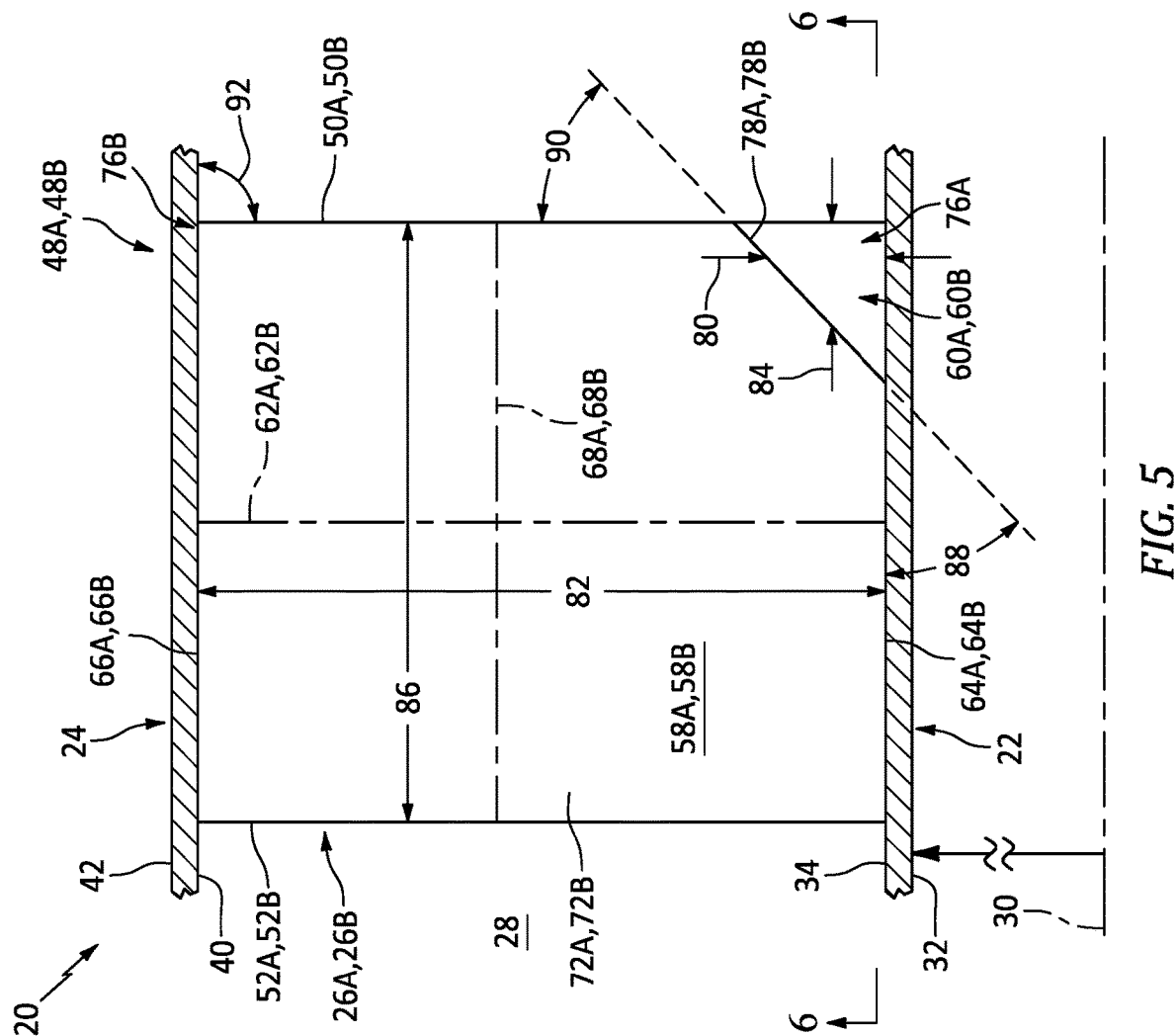
FIG. 5 is a sectional illustration of a portion of the vane array structure at an exemplary stator vane.
Figure 6:
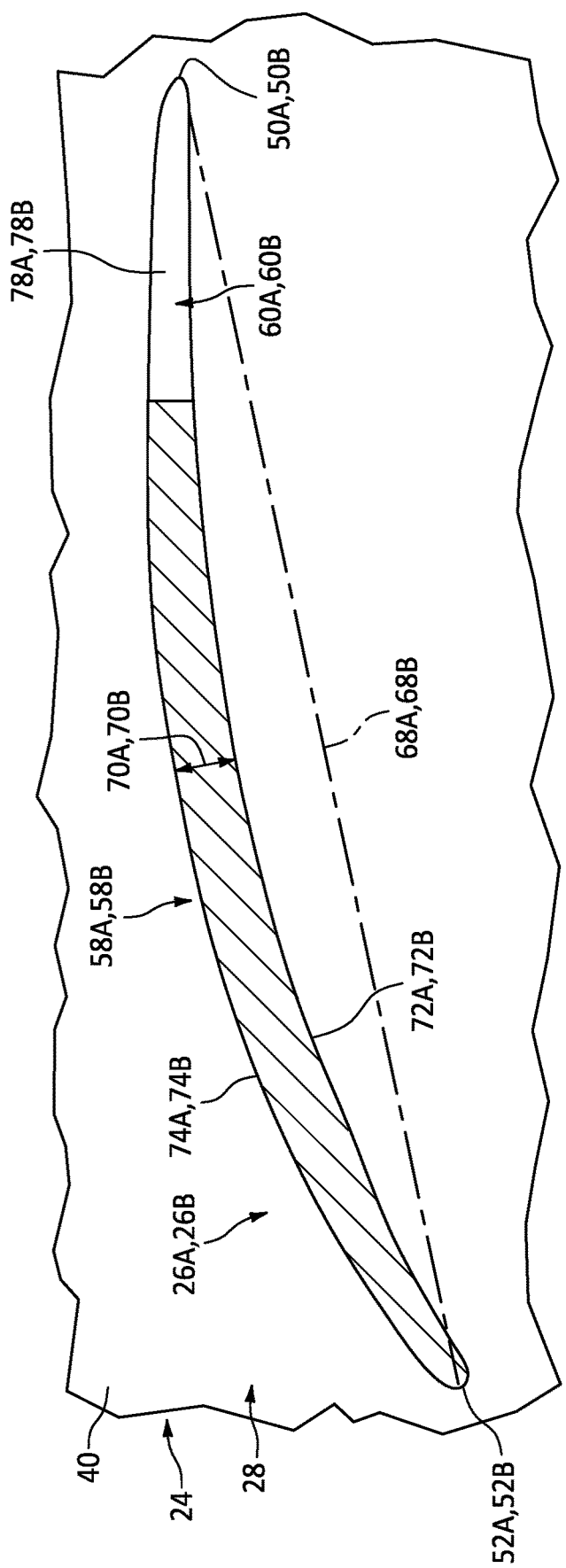
FIG. 6 is a sectional illustration of a portion of the vane array structure taken along line 6-6 in FIG. 5.

Referring to FIG. 5, each stator vane 26A, 26B includes a vane airfoil 58A, 58B (generally referred to as "58") and a vane recess 60A, 60B (generally referred to as "60"). The vane airfoil 58A, 58B extends spanwise along a span line 62A, 62B (generally referred to as "62") of the respective vane airfoil 58A, 58B between and to an inner end 64A, 64B (generally referred to as "64") of the respective vane airfoil 58A, 58B and an outer end 66A, 66B (generally referred to as "66") of the respective vane airfoil 58A, 58B. The airfoil inner end 64 is disposed at the inner platform outer side 34. The airfoil outer end 66 is disposed at the outer platform inner side 40. The vane airfoil 58A, 58B extends chordwise along a chord line 68A, 68B (generally referred to as "68") of the respective vane airfoil 58A, 58B between and to a/the leading edge 52A, 52B (generally referred to as "52") of the respective vane airfoil 58A, 58B and a/the trailing edge 50A, 50B (generally referred to as "50") of the respective vane airfoil 58A, 58B. Referring to FIG. 6, the vane airfoil 58A, 58B extends laterally (e.g., generally circumferentially) along a lateral thickness 70A, 70B (generally referred to as "70") of the respective vane airfoil 58A, 58B between and to opposing lateral sides 72A, 72B (generally referred to as "72") and 74A, 74B (generally referred to as "74") of the respective vane airfoil 58A, 58B. These airfoil sides 72 and 74 may extend chordwise between and meet at the respective airfoil leading edge 52 and the respective airfoil trailing edge 50. The airfoil first side 72 may be a concave and/or pressure side of the respective vane airfoil 58. The airfoil second side 74 may be a convex and/or suction side of the respective vane airfoil 58. Referring to FIG. 5, the airfoil sides 72 and 74 may also extend spanwise between and to the respective airfoil inner end 64/the inner platform 22 and its outer side 34 and the respective airfoil outer end 66/the outer platform 24 and its inner side 40.

The stator vane 26 of FIG. 5 is configured with its vane recess 60 at an inner corner 76A between the airfoil trailing edge 50 and the airfoil inner end 64. The vane recess 60 may be configured as a cutout, a notch, a groove or another type of aperture in the vane airfoil 58. The vane recess 60A, 60B of FIG. 5, for example, projects spanwise along the span line 62A, 62B into the vane airfoil 58A, 58B from the airfoil inner end 64A, 64B to an end 78A, 78B (generally referred to as "78") (e.g., a peripheral edge) of the vane recess 60A, 60B. The vane recess 60 projects chordwise along the chord line 68 into the vane airfoil 58 from the airfoil trailing edge 50 to the recess end 78. Referring to FIG. 6, the vane recess 60 extends laterally through the vane airfoil 58 between and to the airfoil sides 72 and 74.

Referring to FIG. 5, the vane recess 60 has a spanwise height 80 measured along the span line 62 from the airfoil inner end 64 and/or the inner platform outer side 34 to the recess end 78. This recess height 80 may decrease as the vane recess 60 projects chordwise into and/or within the vane airfoil 58. The vane recess 60 may thereby have a radially tapered geometry. However, it is contemplated the recess height 80 may alternatively remain uniform (e.g., constant) chordwise along at least a portion or an entirety of the vane recess 60.

The vane airfoil 58 has a spanwise height 82 measured along the span line 62 from the airfoil inner end 64 and/or the inner platform outer side 34 to the airfoil outer end 66 and/or the outer platform inner side 40. A value of the recess height 80 may be equal to or less than twenty or twenty-five percent (20-25%) of a value of the airfoil height 82. The recess height value, for example, may be between one percent (1%) and ten percent (10%) or between ten percent (10%) and twenty percent (20%) of the airfoil height value. The recess height value may be measured at a location chordwise on, adjacent or proximate the airfoil trailing edge 50. The recess height value may be a maximum value of the recess height 80 chordwise along the vane recess 60. The airfoil height 82 may be uniform chordwise along the vane airfoil 58, for example, from the airfoil leading edge 52 to the vane recess 60. Alternatively, the airfoil height 82 may change (e.g., increase, decrease or fluctuate) chordwise along the vane airfoil 58. In either case, the airfoil height value may be a maximum value of the airfoil height 82 chordwise along the vane airfoil 58.

The vane recess 60 has a chordwise length 84 measured along the chord line 68 from the airfoil trailing edge 50 to the recess end 78. This recess length 84 may decrease as the vane recess 60 projects spanwise into and/or within the vane airfoil 58. The vane recess 60 may thereby have a longitudinally tapered geometry. However, it is contemplated the recess length 84 may alternatively remain uniform (e.g., constant) spanwise along at least a portion or the entirety of the vane recess 60.

The vane airfoil 58 has a chordwise length 86 measured along the chord line 68 from the airfoil leading edge 52 to the airfoil trailing edge 50. A value of the recess length 84 may be equal to or less than twenty or twenty-five percent (20-25%) of a value of the airfoil length 86. The recess length value, for example, may be between one percent (1%) and ten percent (10%) or between ten percent (10%) and twenty percent (20%) of the airfoil length value. The recess length value may be measured at a location spanwise on, adjacent or proximate the airfoil inner end 64 and/or the inner platform outer side 34. The recess length value may be a maximum value of the recess length 84 spanwise along the vane recess 60. The airfoil length 86 may be uniform spanwise along the vane airfoil 58, for example, from the airfoil outer end 66 to the vane recess 60. Alternatively, the airfoil length 86 may change (e.g., increase, decrease or fluctuate) spanwise along the vane airfoil 58. In either case, the airfoil length value may be a maximum value of the airfoil length 86 spanwise along the vane airfoil 58.

With the foregoing arrangement, the airfoil length 86 has a first value at an intermediate point (e.g., mid-point) along the span line 62, a second value at an inner end point adjacent or proximate the inner platform 22, and a third value at an outer end point adjacent or proximate the outer platform 24. The airfoil length second value is less than the airfoil length first value and the airfoil length third value. The airfoil length second value, for example, may be between eighty percent (80%) and ninety-five percent (95%) of the airfoil length first value. The airfoil length third value may be equal to or different (e.g., less or greater) than the airfoil length first value. The airfoil length third value, for example, may be between ninety-five percent (95%) and one-hundred and five percent (105%) of the airfoil length first value. The present disclosure, however, is not limited to such exemplary dimensional relationships.

The recess end 78 forms a trailing edge of the stator vane 26 along the vane recess 60, which is chordwise setback from the airfoil trailing edge 50. The recess end 78 of FIG. 5 is angularly offset from the airfoil inner end 64 and/or the inner platform outer side 34 by a first offset angle 88. This first offset angle 88 may be measured at an intersection between the recess end 78 and the airfoil inner end 64. The first offset angle 88 may be an acute angle between, for example, ten degrees (10°) and seventy degrees (70°); e.g., between twenty degrees (20°) and forty-five degrees (45°) or between forty-five degrees (45°) and seventy degrees (70°). The present disclosure, however, is not limited to such an exemplary arrangement.

The recess end 78 of FIG. 5 is also angularly offset from the airfoil trailing edge 50 by a second offset angle 90. This second offset angle 90 may be measured at an intersection between the recess end 78 and the airfoil trailing edge 50. The second offset angle 90 may be an acute angle between, for example, ten degrees (10°) and seventy degrees (70°); e.g., between twenty degrees (20°) and forty-five degrees (45°) or between forty-five degrees (45°) and seventy degrees (70°). The present disclosure, however, is not limited to such an exemplary arrangement.

The first offset angle 88 may be equal to or different (e.g., greater or less) than the second offset angle 90. The first offset angle 88 and/or the second offset angle 90, however, may each be less than a third offset angle 92 between the airfoil trailing edge 50 and the airfoil outer end 66 and/or the outer platform inner side 40. This third offset angle 92 may be measured at an intersection between the airfoil trailing edge 50 and the airfoil outer end 66 and/or the outer platform inner side 40. The third offset angle 92 may be a right angle or a relatively large acute angle. The third offset angle 92, for example, may be between eighty degrees (80°) and ninety degrees (90°). With this arrangement, an outer corner 76B between the airfoil outer end 66 and the airfoil trailing edge 50 is configured without a recess. In other embodiments, however, it is contemplated the vane airfoil 58 may also include a recess (e.g., a recess like the vane recess 60) at the outer corner 76B. In still other embodiments, it is contemplated the vane recess 60 may alternatively be configured at the outer corner 76B rather than the inner corner 76A.

Figure 7:
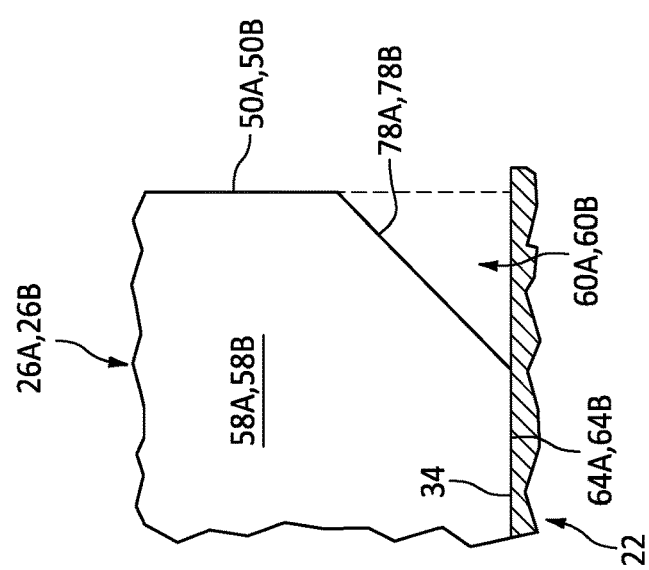
FIG. 7 is a sectional illustration of a portion of the vane array structure at a vane recess with a straight line recess end.
Figure 8A:
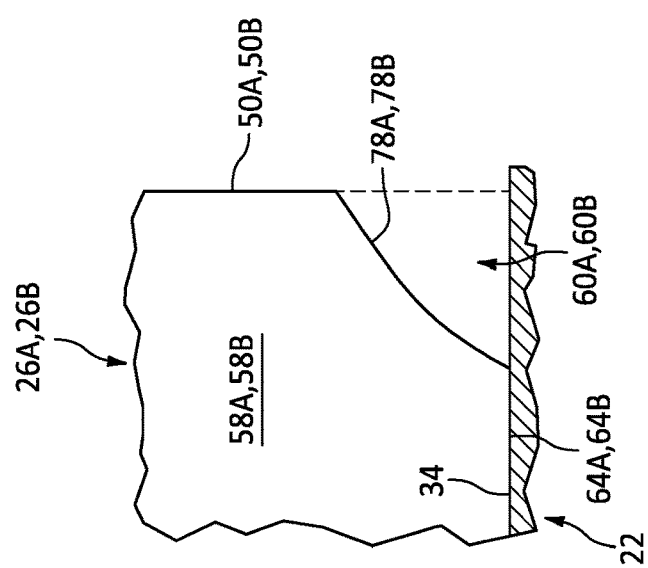
FIGS. 8A and 8B are sectional illustrations of a portion of the vane array structure at a vane recess with various non-straight line recess end arrangements.

Referring to FIG. 7, at least a portion or an entirety of the recess end 78 may have and/or follow a straight line geometry when viewed, for example, in a second reference plane parallel with (e.g., containing) the span line 62 (see FIG. 5) of the respective stator vane 26. Alternatively, referring to FIGS. 8A and 8B, at least a portion or entirety of the recess end 78 may have and/or follow a curved (e.g., arcuate, splined, concave, convex, etc.) geometry when viewed, for example, in the second reference plane.

Referring to FIG. 1, during operation, a gas such as core air flows in a downstream direction longitudinally through the core flowpath 28. Referring to FIG. 4, the gas may be turned by the stator vanes 26A and 26B as the gas passes though the vane arrays 48A and 48B. A wake may be formed and extend downstream from each upstream vane trailing edge 50A. A bow wave may be formed and extend upstream from each downstream vane leading edge 52B. These wakes and bow waves may interact and generate a back pressure within the vane array structure 20 along the core flowpath 28, particularly in a boundary layer flow along the inner platform outer side 34. Configuring the stator vanes 26A, 26B with the vane recesses 60A, 60B may reduce the back pressure. For example, providing the upstream vanes 26A with the vane recesses 60A may facilitate pulling of the wakes circumferentially away from the downstream vanes 26B and/or reducing a size of each wake. Providing the downstream vanes 26B with the vane recesses 60B may facilitate pulling the bow waves closer to the respective downstream vane 26B and/or reducing a size of each bow wave. More particularly, each vane recess 60 provides a leakage path for the gas to travel across the respective stator vane 26. This leakage is tuned to reduce the backpressure within the vane array structure 20.

In some embodiments, referring to FIG. 1, each of the stator vanes 26A, 26B may include a respective vane recess 60A, 60B. However, in other embodiments, the upstream vanes 26A may be configured with their vane recesses 60A while the downstream vanes 26B may be configured without the vane recesses 60B. In still other embodiments, the downstream vanes 26B may be configured with their vane recesses 60B while the upstream vanes 26A may be configured without the vane recesses 60A.

Figure 8B:
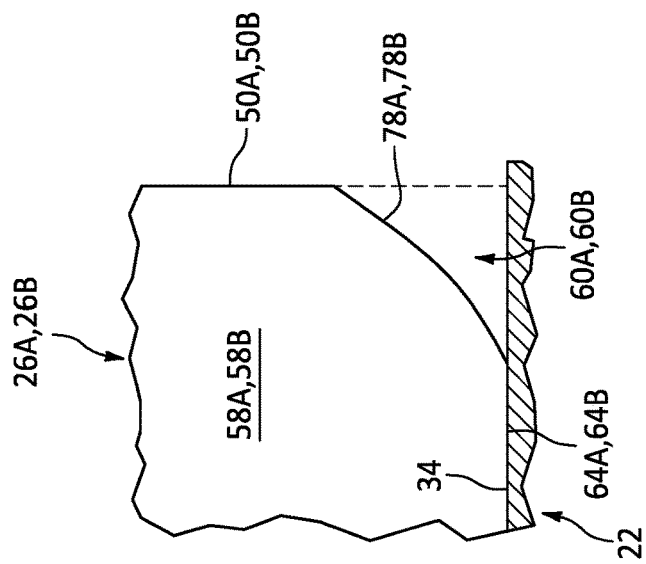
Figure 9:
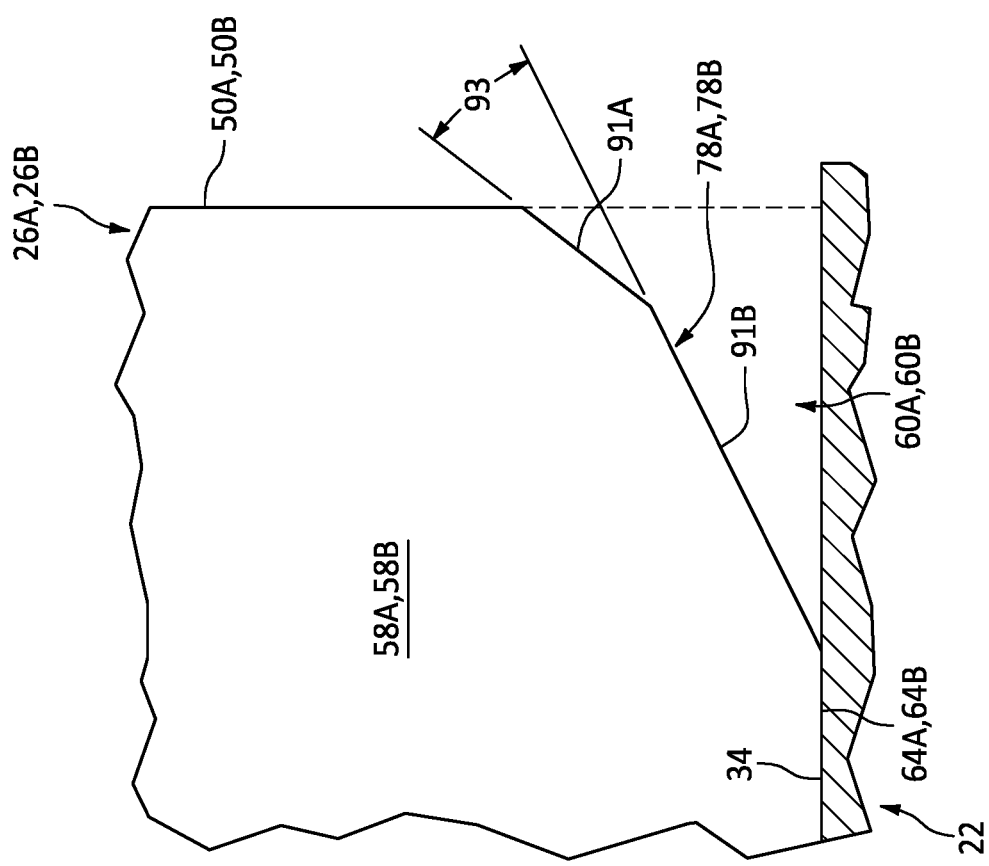
FIG. 9 is a sectional illustration of a portion of the vane array structure at a vane recess with a compound recess end.

In some embodiments, referring to FIGS. 7-8B, the recess end 78 may follow a single straight and/or curved line geometry from the airfoil trailing edge 50 to the airfoil inner end 64. In other embodiments, referring to FIG. 9, the recess end 78 may alternatively follow a compound line geometry within multiple line segments 91A and 91B (generally referred to as "91") from the airfoil trailing edge 50 to the airfoil inner end 64. The first (e.g., outer) line segment 91A of FIG. 9 extends from the airfoil trailing edge 50 to an intersection with the second (e.g., inner) line segment 91B. The second line segment 91B of FIG. 9 extends from the airfoil inner end 64 to the intersection with the first line segment 91A. At the intersection, the line segments 91 are angularly offset from one another by an acute angle 93. This angle 93 may be less than twenty degrees (20°), between twenty degrees (20°) and forty-five degrees (45°), or greater than forty-five degrees (45°). While the line segments 91 are shown in FIG. 9 as straight line segments, one or both of these line segments 91 may alternatively be curved line segments or otherwise non-straight.

Figure 10:
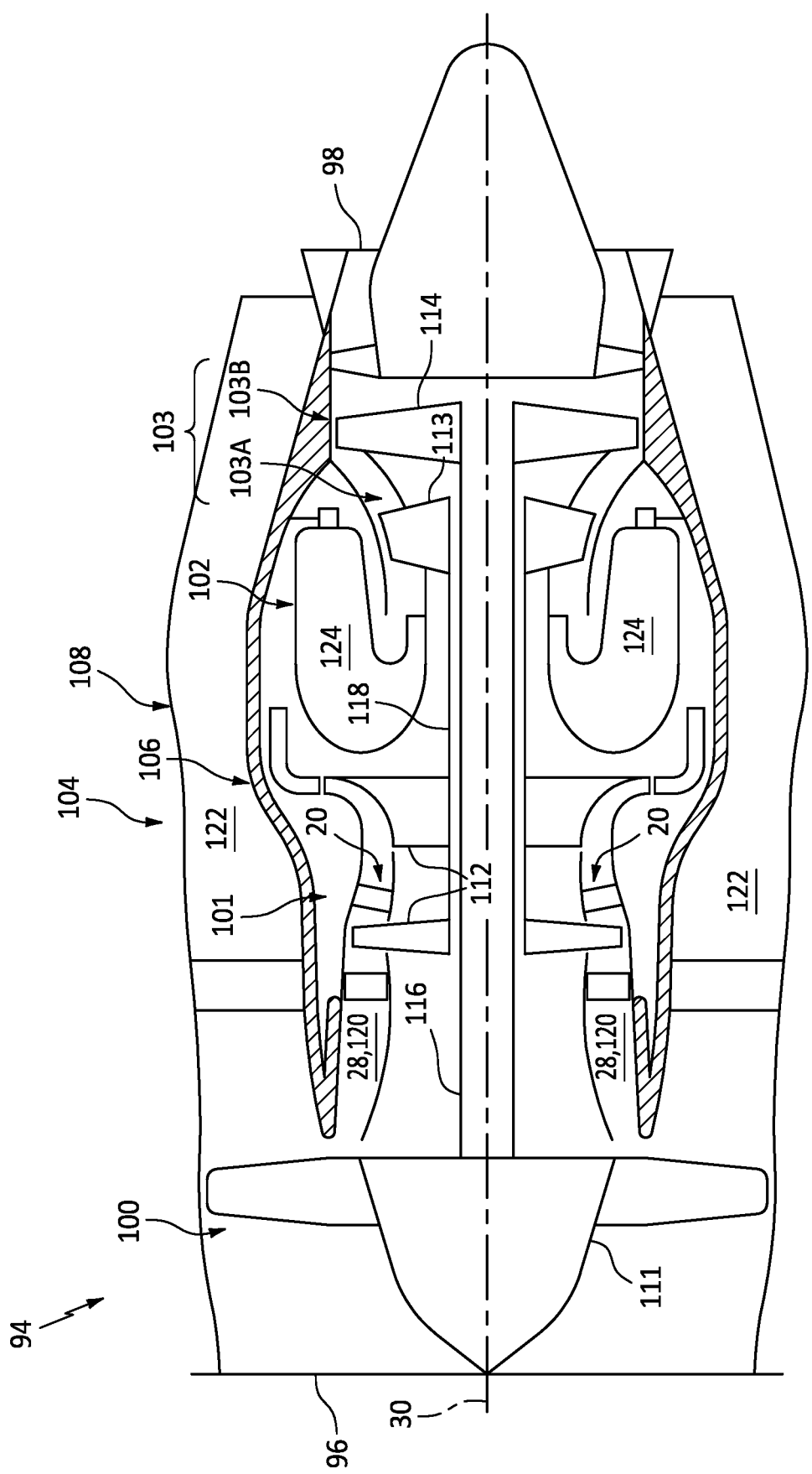
FIG. 10 is a side schematic illustration of a gas turbine engine.

FIG. 10 illustrates an example of the gas turbine engine with which the vane array structure 20 of FIG. 1 may be configured. This gas turbine engine may be configured as a turbofan gas turbine engine 94. The gas turbine engine 94 of FIG. 10, for example, extends axially along the axial centerline 30 between an upstream airflow inlet 96 and a downstream airflow exhaust 98. The gas turbine engine 94 includes a fan section 100, a compressor section 101, a combustor section 102 and a turbine section 103. The turbine section 103 includes a high pressure turbine (HPT) section 103A and a low pressure turbine (LPT) section 103B, which LPT section 103B may also be referred to as a power turbine (PT) section.

The engine sections 100-103B are arranged within an engine housing 104. This engine housing 104 includes an inner case 106 (e.g., a core case) and an outer case 108 (e.g., a fan case). The inner case 106 may house one or more of the engine sections 101-103B; e.g., a core of the gas turbine engine 94. The outer case 108 may house at least the fan section 100.

Each of the engine sections 100, 101, 103A and 103B includes a respective bladed rotor 111-114. Each of these bladed rotors 111-114 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 111 is connected to and driven by the LPT rotor 114 through a low speed shaft 116. The compressor rotor 112 is connected to and driven by the HPT rotor 113 through a high speed shaft 118. The shafts 116 and 118 are rotatably supported by a plurality of bearings (not shown). Each of these bearings is connected to the engine housing 104 by at least one stationary structure.

During operation, air enters the gas turbine engine 94 through the airflow inlet 96. This air is directed through the fan section 100 and into a core flowpath 120 (e.g., the flowpath 28) and a bypass flowpath 122. The core flowpath 120 extends sequentially through the engine sections 101-103B. The air within the core flowpath 120 may be referred to as "core air". The bypass flowpath 122 extends through a bypass duct, which bypasses the engine core. The air within the bypass flowpath 122 may be referred to as "bypass air".

The core air is compressed by the compressor rotor 112 and directed into a combustion chamber 124 of a combustor in the combustor section 102. Fuel is injected into the combustion chamber 124 and mixed with the compressed core air to provide a fuel-air mixture. This fuel air mixture is ignited and combustion products thereof flow through and sequentially cause the HPT rotor 113 and the LPT rotor 114 to rotate. The rotation of the HPT rotor 113 drives rotation of the compressor rotor 112 and, thus, compression of the air received from a core airflow inlet. The rotation of the LPT rotor 114 drives rotation of the fan rotor 111, which propels the bypass air through and out of the bypass flowpath 122. The propulsion of the bypass air may account for a majority of thrust generated by the gas turbine engine 94.

The vane array structure 20 may be included in various gas turbine engines other than the one described above. The vane array structure 20, for example, may be included in a geared gas turbine engine where a geartrain connects one or more shafts to one or more rotors in a fan section, a compressor section and/or any other engine section. Alternatively, the vane array structure 20 may be included in a gas turbine engine configured without a geartrain; e.g., a direct drive gas turbine engine. The vane array structure 20 may be included in a gas turbine engine configured with a single spool, with two spools (e.g., see FIG. 10), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
a vane array structure including a first platform, a second platform, a plurality of vanes and a flowpath extending longitudinally through the vane array structure, the first platform forming a first peripheral boundary of the flowpath, the second platform forming a second peripheral boundary of the flowpath, each of the plurality of vanes extending across the flowpath between the first platform and the second platform, and the plurality of vanes including a first vane and a second vane disposed longitudinally next to the first vane along the flowpath;
the first vane including a first airfoil and a first recess;
the first airfoil extending spanwise along a span line between a first end at the first platform and a second end at the second platform, the first airfoil extending chordwise along a chord line between a leading edge and a trailing edge, and the first airfoil extending laterally between a first side and a second side; and
the first recess projecting spanwise into the first airfoil from the first end, the first recess projecting chordwise into the first airfoil from the trailing edge, and the first recess extending laterally through the first airfoil between the first side and the second side,
wherein:
the first recess projects spanwise into the first airfoil to a recess end; and the recess end has a compound geometry from the trailing edge to the first end, the compound geometry comprising at least two intersecting straight line segments and a recess height that is uniform chordwise along a portion of the first recess.

2. The apparatus of claim 1, wherein the first vane is upstream of the second vane along the flowpath.

3. The apparatus of claim 1, wherein the first vane is downstream of the second vane along the flowpath.

4. The apparatus of claim 1, wherein
the first platform is a radial inner platform; and
the second platform is a radial outer platform that circumscribes the radial inner platform.

5. The apparatus of claim 1, wherein a spanwise height of the first recess decreases as the first recess projects chordwise into the first airfoil.

6. The apparatus of claim 1, wherein a chordwise length of the first recess decreases as the first recess projects spanwise into the first airfoil.

7. The apparatus of claim 1, wherein
the recess end is angularly offset from the first end of the first airfoil by an angle between ten degrees and seventy degrees.

8. The apparatus of claim 1, wherein
the recess end is angularly offset from the trailing edge of the first airfoil by an angle between ten degrees and seventy degrees.

9. The apparatus of claim 1, wherein
the first airfoil has an airfoil spanwise height; and
the first recess has a recess spanwise height that is less than or equal to ten percent of the airfoil spanwise height.

10. The apparatus of claim 1, wherein
the first airfoil has an airfoil spanwise height; and
the first recess has a recess spanwise height that is between ten percent and twenty percent of the airfoil spanwise height.

11. The apparatus of claim 1, wherein
the first airfoil has an airfoil chordwise length; and
the first recess has a recess chordwise length that is less than or equal to ten percent of the airfoil chordwise length.

12. The apparatus of claim 1, wherein
the first airfoil has an airfoil chordwise length; and
the first recess has a recess chordwise length that is between ten percent and twenty percent of the airfoil chordwise length.

13. The apparatus of claim 1, wherein the trailing edge of the first airfoil is angularly offset from the second peripheral boundary of the flowpath, at an intersection between the trailing edge of the first airfoil and the second platform, by an angle between eighty degrees and ninety degrees.

14. The apparatus of claim 1, wherein
the second vane includes a second airfoil with a leading edge; and
the leading edge of the second airfoil is circumferentially offset from the leading edge of the first airfoil about a centerline of the vane array structure.

15. The apparatus of claim 1, wherein
the second vane includes a second airfoil and a second recess;
the second airfoil extends spanwise along a span line of the second airfoil between a first end of the second airfoil at the first platform and a second end of the second airfoil at the second platform, the second airfoil extends chordwise along a chord line of the second airfoil between a leading edge of the second airfoil and a trailing edge of the second airfoil, and the second airfoil extends laterally between a first side of the second airfoil and a second side of the second airfoil; and
the second recess projects spanwise into the of the second airfoil from the first end of the second airfoil, the second recess projects chordwise into the second airfoil from the trailing edge of the second airfoil, and the second recess extends laterally through the second airfoil between the first side of the second airfoil and the second side of the second airfoil.

16. An apparatus for a gas turbine engine, comprising:
a vane array structure including a first platform, a second platform, a plurality of vanes and a flowpath extending longitudinally through the vane array structure, the first platform forming a first peripheral boundary of the flowpath, the second platform forming a second peripheral boundary of the flowpath, each of the plurality of vanes extending across the flowpath between the first platform and the second platform, and the plurality of vanes including a first vane and a second vane disposed longitudinally next to the first vane along the flowpath;
the first vane extending spanwise along a span line from the first platform to the second platform, the first vane extending chordwise along a chord line between a leading edge and a trailing edge, and the first vane extending laterally between a first side and a second side; and
the first vane having a chordwise length, the chordwise length having a first value at an intermediate point along the span line, the chordwise length having a second value at a first end point adjacent the first platform, and the chordwise length having a third value at a second end point adjacent the second platform, wherein the second value is less than the first value and the third value, such that a recess projects spanwise into the first vane adjacent the first platform to a recess end,
wherein the recess end has a compound geometry from the trailing edge to the first end, the compound geometry comprising at least two intersecting straight line segments and a recess height that is uniform chordwise along a portion of the recess.

17. An apparatus for a gas turbine engine, comprising:
a vane array structure including a first platform, a second platform, a plurality of vanes and a flowpath extending longitudinally through the vane array structure, the first platform forming a first peripheral boundary of the flowpath, the second platform forming a second peripheral boundary of the flowpath, each of the plurality of vanes extending across the flowpath from the first platform to the second platform, a first set of the plurality of vanes arranged into a first array about a centerline, a second set of the plurality of vanes arranged into a second array about the centerline, and the second array disposed longitudinally next to the first array along the flowpath;
the first set of the plurality of vanes comprising a first vane, and the second set of the plurality of vanes comprising a second vane;
the first vane including a first airfoil and a first recess projecting into the first airfoil from a trailing edge of the first airfoil, and the first recess adjacent the first platform; and
the second vane including a second airfoil and a second recess projecting into the second airfoil from a trailing edge of the second airfoil, and the second recess adjacent the first platform, wherein the first recess projects spanwise into the first airfoil to a first recess end, wherein the second recess projects spanwise into the second airfoil to a second recess end, and wherein the first recess end or the second recess end has a compound geometry from a respective trailing edge to a respective first end, the compound geometry comprising at least two intersecting straight line segments and a recess height that is uniform chordwise along a portion of the first recess or the second recess.

* * * * *